United States Patent [19]
Ernst

[11] 3,873,909
[45] Mar. 25, 1975

[54] GYROMAGNETIC APPARATUS EMPLOYING COMPUTER MEANS FOR CORRECTING ITS OPERATING PARAMETERS

[75] Inventor: Richard R. Ernst, Palo Alto, Calif.
[73] Assignee: Varian Associates, Palo Alto, Calif.
[22] Filed: Aug. 21, 1967
[21] Appl. No.: 661,985

[52] U.S. Cl............ 324/0.5 R, 324/.5 A, 324/.5 AH
[51] Int. Cl............................................. G01n 27/78
[58] Field of Search .......... 324/.5, 58.5; 356/80, 81; 235/151.35

[56] References Cited
UNITED STATES PATENTS
3,012,139  12/1961  Hanson............................ 250/41.9
3,297,860   1/1967  Weiss................................... 324/.5

OTHER PUBLICATIONS
A-60A, Nuclear Magnetic Resonance Analytical Spectrometer System – Varian Assoc. – June, 1965, pp. 4 and 5.

Primary Examiner—Michael J. Lynch
Attorney, Agent, or Firm—Stanley Z. Cole; Gerald M. Fisher

[57] ABSTRACT

A gyromagnetic resonance spectrometer is disclosed which employs a computer for correcting its operating parameters. The gyromagnetic resonance spectrometer includes means for exciting and detecting gyromagnetic resonance of a sample of matter to be investigated in a polarizing magnetic field. The output spectral data from the spectrometer are fed to a computer. The computer includes a memory and a logic unit programmed to process the data stored in the memory according to a pre-determined program. The computer includes programs for causing certain resonance determinative operating parameters of the spectrometer to be varied in certain ways to cause the output spectral data of the spectrometer to vary accordingly. The spectral data are stored in the memory of the computer and the computer processes the stored data to derive certain corrective outputs which are fed from the computer to the spectrometer for correcting the operating resonance determinative parameters of the spectrometer to yield corrected resonance spectral data. The computer may be programmed to correct any one or more of the following operating parameters of the spectrometer: field strength and homogeneity of the polarizing magnetic field, phase and/or frequency of radio frequency resonance exciting field, intensity of the radio frequency resonance exciting field, rate at which the gyromagnetic ratio is swept in the spectrometer to obtain output spectral data, time constants of filter circuits employed in the receiver of the spectrometer, frequencies and intensities of radio frequency energy applied to the sample in performing certain double resonance analysis, sample spinning rate for averaging gradients of the polarizing field, and intensity of the polarizing magnetic field.

The computer may use any one of a number of different methods for deriving the corrective outputs for correcting the operating parameters of the spectrometer.

9 Claims, 8 Drawing Figures

INVENTOR.
RICHARD R. ERNST
BY
ATTORNEY 3,873,909

GYROMAGNETIC APPARATUS EMPLOYING COMPUTER MEANS FOR CORRECTING ITS OPERATING PARAMETERS

DESCRIPTION OF THE PRIOR ART

Heretofore, gyromagnetic resonance spectrometers have been employed with computers for improving the output spectral data from a spectrometer. More specifically, computers have been utilized for time-averaging the spectral data from a number of successive resonance spectra to average out the noise and thereby improve the singal-to-noise ratio of the spectral data. In such systems, the computers include a memory unit and a logic unit. The output spectral data from the spectrometer is fed to the computer which stores the spectral data in its memory. The spectral data from the next consecutive scan is separated into its components and added in the memory to the spectral data from the previous spectrum. This process is repeated for a relatively large number of successive spectrums and the final corrected output spectrum is obtained by a read-out from the computer which adds all of the spectral data for the various components of the spectrum. This prior computer system also included means for synchronizing the scan of the computer with the scan of the spectrometer by monitoring a reference spectral line of the spectrum and triggering a scan of the spectrometer and a scan within the computer by reference to the reference line of the spectrum. However, the computer did not process spectral data stored in the memory of the computer to derive corrections to be fed back to the spectrometer for correcting the spectral output data of the spectrometer.

Other prior art spectrometers have included means for automatically monitoring certain operating parameters of the spectrometer and automatically optimizing the parameters to optimize the output spectral data of the spectrometer. Such a system is described and claimed in copending U.S. Application Ser. No. 681,057, filed Oct. 25, 1967, now U.S. Pat. No. 3,443,209, and assigned to the same assignee as the present invention. In this prior system, a field frequency lock is employed to lock the spectrometer to a reference line of the spectrum, while a modulating current is fed into one of the field homogenizing coils. The modulation of the current in the homogenizing coil modulates a gradient of the polarizing magnetic field to modulate the line height of the resonance line being monitored. A stage of phase-sensitive detection is employed to derive a correction to yield maximum signal height and, thus, maximum homogeneity for that particular gradient. While such a system is useful for many applications, not involving the use of a computer, there are still many applications for spectrometers which require the improved performance which can be obtained by the combination of a spectrometer and a computer. When a computer is included as part of a system, it becomes desirable for the computer to perform as many of the optimizing functions as can be performed thereby deleting the requirement for special accessory equipments heretofore employed for optimizing various operating parameters of the spectrometer.

SUMMARY OF THE PRESENT INVENTION

The principal object of the present invention is the provision of an improved gyromagnetic resonance spectrometer apparatus.

One feature of the present invention is the provision, in a gyromagnetic resonance apparatus employing a computer, of means in the computer for storing gyromagnetic resonance data and means for processing the data stored in the memory to derive a corrective output which is fed to the spectrometer for correcting one or more of the operating parameters of the spectrometer to obtain corrected gyromagnetic resonance spectral data.

Another feature of the present invention is the same as the preceding feature wherein the corrective output derived from the computer corrects one or more of the following operating parameters of the spectrometer: homogeneity of the polarizing magnetic field, stability of the polarizing magnetic field, intensity of the polarizing magnetic field, frequency and/or phase of the radio frequency resonance exciting field, intensity of the radio frequency resonance exciting field, rate of scan of the gyromagnetic ratio of the frequency of the exciting radio frequency field to the intensity of the polarizing magnetic field, time constants of certain filters in the resonance receiving portion of the spectrometer, frequency and/or intensity of a second radio frequency field applied to the sample to obtain double resonance analysis of the sample, and sample spinning rate for line narrowing.

Another feature of the present invention is the same as any one or more of the preceding features wherein the computer includes means for varying one or more of the operating parameters of the spectrometer and wherein the computer processes the stored resonance data to derive the corrective output fed back to the spectrometer for correcting the operation thereof.

Another feature of the present invention is the same as any one or more of the preceding features wherein the computer includes means for causing at least two of the resonance determinative operating parameters of the spectrometer to take certain pre-determined sets of values in the nature of a grid pattern of such parameters in parameter space, and wherein the computer processes the stored resultant resonance data to derive the corrective output which is fed to the spectrometer for correcting the operating parameters thereof.

Another feature of the present invention is the same of any one of the preceding features wherein the computer includes means for comparing a first set of stored resonance data with a second set of stored resonance data to derive the corrective output for the spectrometer.

Other features and advantage of the present invention will become apparent on a perusal of the following specification taken in connection with the accompanying drawings wherein:

DESCRIPTION OF THE PREFERRED EMBODIMENTS

Figure 1:
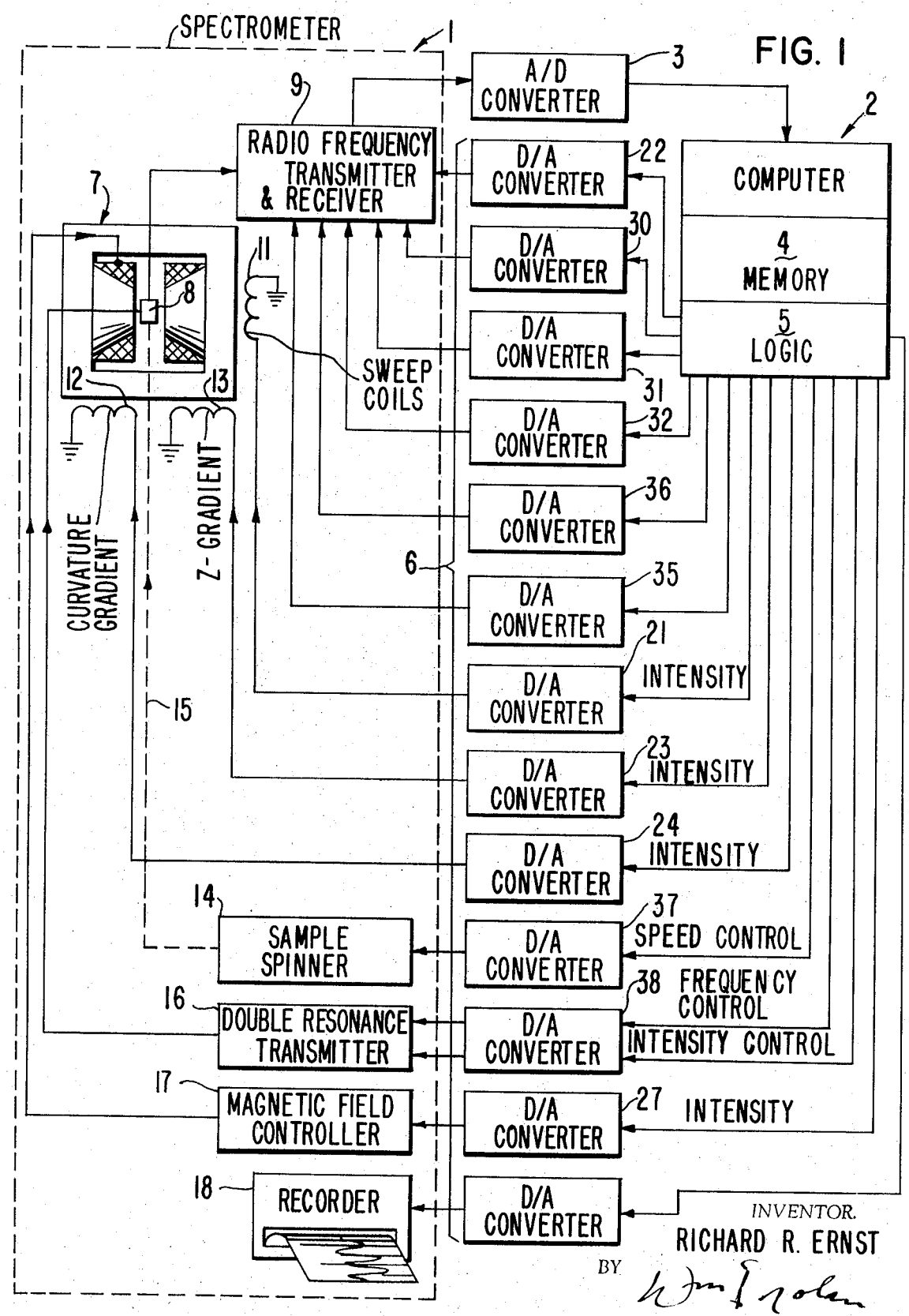
FIG. 1 is a schematic block diagram of a combined spectrometer and computer incorporating features of the present invention.

Referring now to FIG. 1, there is shown a combined spectrometer and computer apparatus incorporating features of the present invention. More specifically, a gyromagnetic resonance spectrometer, generally indicated by dotted block 1, has the output thereof fed to a digital computer 2 via an analog-to-digital converter 3. The computer 2 includes a memory unit 4 and a logic unit 5. Gyromagnetic resonance data fed to the computer 2 from the spectrometer 1 is stored in the memory 4. The logic unit 5 processes the data stored in the memory to derive certain corrective outputs which are fed via a number of digital to analog converters 6 to the spectrometer 1 for causing various operating parameters of the spectrometer 1 to be controlled according to certain programs in the logic unit 5 to produce corrected output spectral data from the spectrometer 1.

The spectrometer 1 includes a magnet 7 for producing an intense unidirectional magnetic field within a sample of matter to be investigated as disposed within a probe unit 8 disposed in the gap of the magnet 7. A radio frequency transmitter and receiver 9 applies radio frequency energy to the sample for exciting and detecting gyromagnetic resonance thereof. The detected resonance is received in the receiver portion of the radio frequency transmitter and receiver 9 and fed by an analog-to-digital converter 3 to the computer 2. The magnet 7 includes a pair of sweep coils 11 through which a variable d.c. current is fed for sweeping or scanning the intensity of the polarizing magnetic field. The magnet 7 also includes a pair of gradient corrective coils 12 and 13 through which variable d.c. currents are fed for cancelling certain magnetic field gradients in the polarizing magnetic field. For the sake of explanation, only two such gradient coils 12 and 13 are shown but it is to be understood that a typical spectrometer 1 may include several sets of such coils for cancelling different ones of the various gradients in the polarizing magnetic field.

A sample spinner 14 is provided for spinning the sample within the polarizing field for averaging out certain of the gradients in the polarizing field which are in directions normal to the axis about which the sample is spun. Typically, the sample is spun by means of an air-driven turbine, indicated by dotted line 15. A double resonance radio frequency transmitter 16 is provided for applying a second radio frequency field to the sample for exciting resonance of a second group of gyromagnetic bodies within the sample such that the coupling between the groups, if any, may be analyzed. A magnetic field controller 17 supplies current to the electric coils of the magnet 7 for controlling the d.c. intensity of the polarizing magnetic field. A recorder 18 serves to record the gyromagnetic spectral data which may be derived from the computer 2 or directly from the radio frequency transmitter and receiver 9.

As mentioned above, the computer 2 serves to store the gyromagnetic resonance date and to perform certain operations on this data to derive certain corrective outputs which are fed via the digital to analog converters 6 to the spectrometer 1 for correcting various operating parameters of the spectrometer 1. A number of different examples will now be given describing various methods and apparatus for correcting the various operating parameters of the spectrometer 1.

The homogeneity of the polarizing magnetic field may be corrected by any one of a number of different methods. In one method, the computer 2 is programmed to scan the polarizing magnetic field intensity via an output applied to a digital-to-analog converter 21 to produce a scan of the polarizing magnetic field by feeding a scan current through sweep coils 11. The computer 2 holds the frequency of the radio frequency energy applied to excite and detect resonance of the sample constant by a signal fed to the radio frequency transmitter and receiver 9 via analog-to-digital converter 22. The scan is continued until resonance is obtained of a certain reference resonance line of a sample, for example, a resonance line produced by water or a resonance line produced by tetramethylsilane (TMS) disposed in the sample. When resonance of the reference line is obtained, the computer 2 stops the sweep and holds the field constant to lock onto resonance of the reference line. While locked to the reference resonance line, the computer 2 varies the current to one of the gradient cancelling coils 13 via digital-to-analog converter 23. The computer measures the peak height of the reference resonance line as a function of the current fed to the gradient coil 13. The computer 2 compares the various measured peak heights and selects a corrective output current for the gradient coil 13 which yields maximum peak height for the reference signal. The computer 2 then switches to a second gradient coil 12 and repeats the same process by means of currents fed to coil 12 via a digital-to-analog converter 24. This process is continued with further gradient coils and then repeated till the signal height reaches a maximum value. This method for correcting gradients of the polarizing magnetic field is relatively fast but has the disadvantage of requiring the field-frequency lock onto the reference line.

An alternative method for correcting the gradients in the polarizing magnetic field is to repetitively scan through a reference resonance line of the sample by a scan current repetitively fed to sweep coils 11 via digital-to-analog converter 21. The peak height of the reference resonance line is measured by the computer 2 for various values of corrective current fed to the various ones of the gradient cancelling coils 12, 13, etc. The computer 2 compares the measured values of peak height and selects a corrective current for the respective gradient cancelling coil which yields maximum peak height of the reference resonance line. This method has the advantage that no field-frequency lock is necessary but has the disadvantage that it is relatively slow if a relatively high degree of accuracy is desired.

Figure 2:
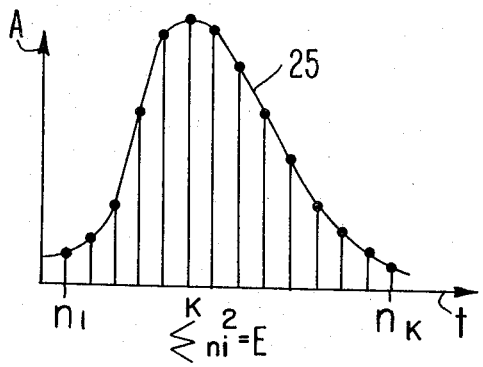
FIG. 2 is a plot of resonance signal amplitude A vs. time depicting a plurality of sampling points for deriving the energy of the line.

Another method for cancelling gradients in the polarizing magnetic field is essentially the same as the last method except that the signal energy contained in the reference line is measured instead of its peak height. The corrective values for the currents in the various gradient cancelling coils is selected by the computer 2 according to the maximum measured values of signal energy. The computer 2 measures the energy of the reference resonance line by a method as indicated in FIG. 2. More specifically, the height of the resonance line 25 is measured at a number of points $n_1, n_2 \ldots n_k$ for each scan through the resonance line. The computer 2 then scans the square of the measured signal height $(n_i)^2$ for $n_1 - n_k$, as indicated by the formula in FIG. 2. This method has the advantage of being relatively fast and sensitive.

Another method for cancelling gradients in the polarizing magnetic field involves the computer 2 repetitively scanning through the reference resonance line while measuring the second moment of the line. The second moment of the line is essentially the line width. The corrective currents for cancelling the gradients are determined by the computer 2 according to the minimum values of the second moment of the reference line. This method has the disadvantage that it requires a relatively slow sweep rate.

Figure 3:
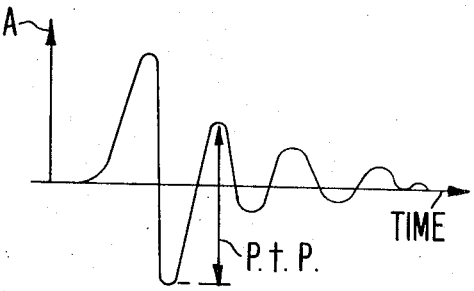
FIG. 3 is a plot of signal amplitude A vs. time depicting a measurement of peak-to-peak amplitude of the first wiggle of the resonance line.

Another method for cancelling the gradients in the polarizing magnetic field is to repetitively scan through the reference resonance line while measuring the peak-to-peak height of the first wiggle of the resonance 1. The peak-to-peak height of the reference resonance line is indicated in FIG. 3. The computer 2 measures the peak-to-peak height and stores the information in its memory as a function of the current through the various gradient cancelling coils. The corrective output current for the respective coils is that value which maximizes the peak-to-peak height of the first wiggle of the resonance line.

Figure 4:
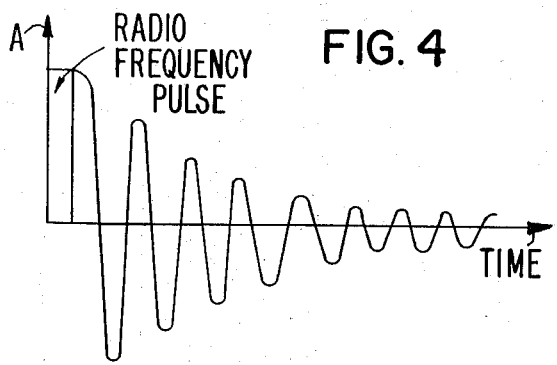
FIG. 4 is a plot of resonance signal amplitude A vs. time depicting the absorption mode of a pulsed resonance signal.

Another method for deriving the proper corrective currents for the gradient cancelling coils is for the computer 2 to adjust the frequency of the radio frequency field and the intensity of the polarizing field for resonance of a reference line via digital-to-analog converters 22 and 21, respectively, and then to pulse the radio frequency transmitter with relatively short bursts of radio frequency energy as of, for example, of one millisecond in length via digital-to-analog converter 30 and a pulse generator inside the transmitter 9. The resultant resonance signal, as indicated in FIG. 4, is then measured for its total signal energy in a method as previously indicated with regard to FIG. 2. The gradient cancelling current, as fed to the gradient cancelling coil, is then varied by the computer 2 and the energy of the resonance line measured and stored in the computer 2. The computer selects a gradient corrective current which maximizes the total signal energy of the reference resonance line. This method has the advantage of being relatively fast and accurate but has the disadvantage that it needs a complicated pulse generator. It is also advantageous in this method to apply a dephasing pulse between each successive pulse measurement of the reference resonance line in order to obtain accurate measurements. A suitable dephasing pulse is a pulsed strong gradient of the polarizing field.

The computer 2 may use any one of a number of different methods for arriving at the various maximum values of peak height, signal energy, etc., as a function of the operating parameter of the spectrometer to be corrected. One such method employs a fixed grid of parameter values as indicated by the grid pattern identified as "iteration" in the plot of FIG. 5. More specifically, certain predetermined discrete values of current to the linear Z gradient coil 13 are matched with certain current values fed to the curvature gradient coil 12 to form a grid of values in parameter space. The computer measures the peak height or other parameters being measured for each of the grid points of values in parameter space. Lines of constat peak height or the other parameter being measured are indicated by the contour lines identified as 2000, 3000 . . . etc, on the plot. The computer 2 selects as the final corrective set of corrective current values for the respective gradient cancelling coils values corresponding to the highest measured peak height. The advantage of this method is that it is relatively fast and employs only a relatively small portion of the memory since only the temporary maximum signal and the temporary optimum parameter values need be stored.

Figure 6:
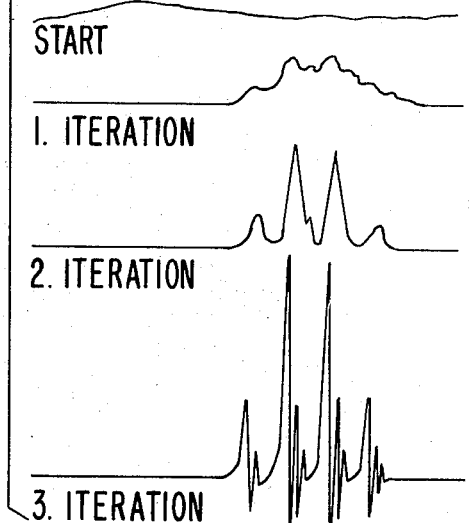
FIG. 6 is a composite plot of a gyromagnetic resonance spectrum depicting resolution obtained for successive gradient corrections obtained by a grid method depicted in FIG. 5.
Figure 5:
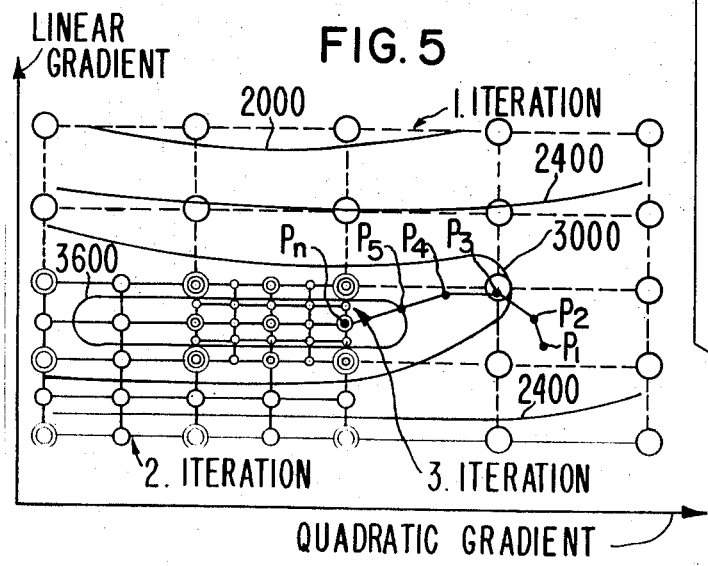
FIG. 5 is a plot of a certain linear gradient amplitude vs. a certain quadratic gradient amplitude depicting grid methods employed by the computer for ascertaining the corrective outputs for the two gradients.

An alternative method employed by the computer 2 for ascertaining the optimum parameter values is also depicted in FIG. 5. In this method, a first fixed, grid pattern in parameter space is employed followed by a second and third iteration with diminishing grid size centered around the optimum value obtained from the first grid pattern. Three successive iterations are depicted in FIG. 5 for arriving at the optimum value. The spectra of FIG. 6 show the substantial enhancement that can be obtained in homogeneity and, thus, resolution of the output spectral data by three successive iterations using the diminishing grid size method. More specifically the spectral data for a proton quartet of acetaldehyde is shown for a start condition and for three successive iterations. An 8 Hz wide water reference resonance line was used for the actual measurement but the resulting homogeneity is indicated by the successive spectra of FIG. 6.

Another method that may be employed by the computer 2 for arriving at the optimum set of parameters is also depicted in FIG. 5. In this method, the computer 2 starts from an arbitrary set of parameter currents for the gradient corrective coils or for any other parameter to be optimized and the spectral parameter being measured is stored in the memory. By a succession of such measurements around the first point P, the computer 2 derives the steepest gradient in the parameter space of the parameters to be corrected. This gives the direction in which the next point $P_2$ of measurement lies by making a number of successive measurements of this type $P_3, P_4 \ldots P_n$ the computer 2 converges on an optimum set of parameter values.

In another method for determining the optimum values for the parameter of interest, a computer utilizes the fixed grid method previously described and, in addition, determines an improved set of parameters by a multidimensional interpolation in the parameter space.

The stability of the polarizing magnetic field may be corrected by any one of several methods. For example, the computer 2 successively scans through a resonance spectrum or through a single reference line and determines the necessary shift to match a spectral line or a reference peak to the same line in a former scan. The correct offset current is then fed by a digital-to-analog converter 27 and magnetic field controller 17 to the coils of the magnet 7. Alternatively, the computer 2 may maximize the cross-correlation of a previous scan stored in the memory as a function of the offset current fed by a digital-analog-converter 27 and magnetic field controller 17 to the magnet 7. The corrective output is then applied to the magnet 7 via digital-to-analog converter 27 and magnetic field controller 17. Another method utilized by the computer 2 for controlling the stability of the polarizing magnetic field is to cause the radio frequency transmitter and receiver 9 to apply a weak pulse of radio frequency energy to the sample at a frequency near the resonance frequency of a reference resonance line. The precession frequency of the resonance line is then hetrodyned with the exciting frequency or another stable frequency and the resultant beat frequency is fed to the computer for measurement of the beat frequency. The decaying resonance line will be similar to that shown in FIG. 4. Its frequency is indicative of the displacement of the magnetic field from the proper value to produce resonance at precisely the frequency of the radio frequency transmitter 9. The computer 2 measures the beat note as a function of the offset current to derive the corrective offset current for stabilizing the magnetic field. In this pulse method, as in the previous pulse method described with regard to homogenizing the polarizing magnetic field, it is desirable to provide a dephasing gradient pulse between successive measurements. Accordingly, a pulse of d.c. current is fed by the computer 2 through any one of the gradient cancelling coils to introduce a substantial gradient for dephasing the precession of the reference line.

Figure 7:
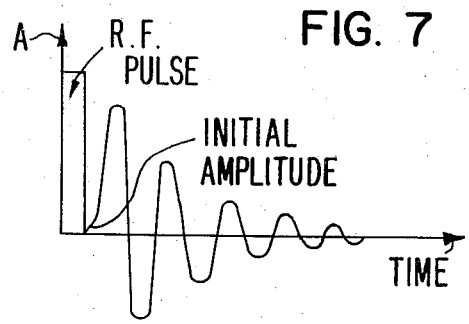
FIG. 7 is a plot of resonance signal amplitude A vs. time for pulsed resonance operating in the dispersive mode.

The phase of the radio frequency energy applied to the sample for exciting resonance is corrected by the computer 2 by any one of a number of different methods. In one method, the phase of the radio frequency energy applied to the sample from a transmitter 9 is adjusted by means of a signal fed to the radio frequency transmitter 9 from the computer 2 by a digital-to-analog converter 31. The computer 2 causes a reference resonance line of the sample to be scanned repetitively by a scan signal fed to the magnet 7 by a digital-to-analog converter 21 and sweep coils 11. The computer 2 measures and stores information with regard to the symmetry of the absorption line of the resonance signal to derive a corrective signal corresponding to the maximum symmetry of the absorption line. The corrective signal is fed to the radio frequency transmitter 9 via the digital-to-analog converter 31 for correcting the phase. In another method for correcting the phase of the radio frequency energy, a reference line is repetitively swept as before and the computer 2 measures and stores information for repetitive sweeps vs. phase adjustment to maximize the integral of the line energy as previously described with regard to FIG. 21. The corrective signal is derived from the computer 2 corresponding to the maximum of the integral of the line energy. In another method for correcting the phase stability of the radio frequency transmitted energy, the peak height of the reference line is measured and stored for repetitive sweeps and the computer 2 processes the stored information to derive a corrective signal corresponding to a maximum peak height of the reference line. In still another method for adjusting the phase of the radio frequency energy, the computer 2 causes the polarizing magnetic field to be scanned by a sweep coil 11 until the reference resonance line is found. Once the resonance line is found, the radio frequency transmitter 9 is pulsed as previously described with regard to FIG. 4. The exponentially decaying resonance signal is then measured and stored by the computer 2. For the dispersion mode, the phase of the radio frequency energy is corrected to a value which causes the initial value of the decaying resonance signal to start from a zero amplitude position as shown in signal of FIG. 7. If the absorption mode is desired, the initial signal amplitude of the decaying precession signal should have a maximum amplitude as indicated in FIG. 4. The computer 2 feeds the corrective phase adjustment to the radio frequency transmitter 9 via digital-to-analog converter 31. This method works best for the dispersion mode since a measurement of a zero amplitude signal is more easily achieved than the measurement of maximum signal amplitude.

Correction of the radio frequency field intensity applied to the sample for exciting resonance is obtained by having the computer 2 vary the intensity of the radio frequency energy via digital-to-analog converter 32 while measuring and storing the signal height of a reference line which is repetitively scanned via scan coil 11 and digital-to-analog converter 21. The computer 2 processes the stored information to derive a corrective signal corresponding to an intensity of the radio frequency transmitter yielding maximum signal height of the reference line. The corrective signal is fed to the radio frequency transmitter via digital-to-analog converter 32.

Figure 8:
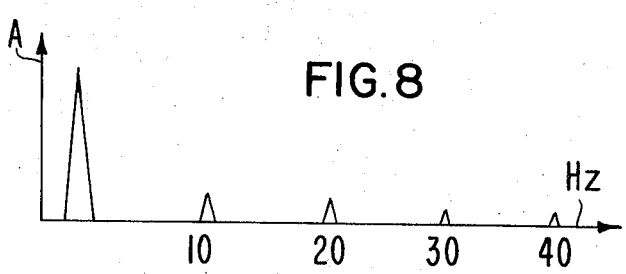
FIG. 8 is a plot of the output spectrum of the spectrometer depicting calibrating sideband resonance signals of a reference line of the spectrum.

The scan rate at which the gyromagnetic ratio is scanned to produce spectral resonance data may be corrected by the computer 2 according to a number of different methods. In one method, the computer feeds a sweep signal through the sweep coils 11 via digital-to-analog converter 21 and measures the intensity of the output resonance lines. When the resonance lines are below a certain threshold level, the scan rate has one value. When the resonance line amplitude is above a certain threshold value, the scan rate is reduced to achieve higher accuracy. In another method, for correcting the scan rate, the computer scans through the resonance spectrum of a sample and amplitude modulates the radio frequency transmitter 9 via digital-to-analog converter 35 at certain predetermined relatively low frequencies such as 10, 20, 30 . . . . . Hz to produce sidebands of the reference line at these successive positions in the resonance spectrum. The computer 2 stores the spectral data in the memory and measures the rate at which these successive reference sidebands are detected in order to derive a correction for the scan rate which is fed via digital-to-analog converter 21 to the sweep coils 11 to correct the scan rate. The reference line spectrum together with its sidebands is indicated in FIG. 8. The sidebands should be sufficiently strong to avoid confusion with lines. In another method for correcting sweep rate, the free induction decay frequency of a strong reference peak is periodically measured by applying a strong r.f. pulse to the samples at the r.f. frequency used to observe resonance of the spectrum. A beat frequency is obtained between resonance of a strong line of the sample and the r.f. frequency. The scan rate is corrected according to the rate of change of the measured beat frequency.

The filter time constants within the receiver circuits of the radio frequency transmitter and receiver 9 may be corrected by the computer 2 according to at least three different methods. In one method, the computer 2 repetitively scans the spectrometer 1 through resonance of a reference line by a signal fed to the sweep coils 11 via digital-to-analog converter 21. The computer 2 stores the resonance data for the repetitive scans and varies the filter time constants via digital-to-analog converter 36. The computer 2 measures the width of the reference line and derives the corrective filter output signal which yields a line width which is approximately twice the width obtained for the narrowest line setting. This filter setting provides maximum signal-to-noise ratio. In another method, the computer 2 repetitively scans the reference line while varying the filter time constants. The computer stores the resonance data and compares the data with the filter settings to derive a corrective filter adjustment which eliminates all wiggles in the reference resonance line. The corrective filter signal is fed to the transmitter and receiver by digital-to-analog converter 36. In a third method, the peak height is measured. The option further reduces the peak height by a factor two.

The rate at which the sample is spun via sample spinner 14 is corrected via the computer 2 as follows: the computer 2 causes the spectrometer 1 to repetitively sweep through a reference line while monitoring the peak heights of the reference line and storing spectral data in the memory. The computer 2 varies the rate at which the sample is spun via sample digital-to-analog converter 37 and sample spinner 14 and selects a corrective output which corresponds with the maximum peak height of the reference resonance line. This corrective output is fed by digital-to-analog converter 37 to the sample spinner 14 for controlling the rate at which the sample is spun in the magnet 7. Additionally, the sample spin rate can be corrected by monitoring signal energy, peak-to-peak height of first wiggle, energy of free induction decay, as indicated for the control of the field homogeneity.

In double resonance analysis, the computer 2 corrects the frequency and intensity of the radio frequency energy applied to the sample via the double resonance transmitter 16. In this method, the computer 2 causes the spectrometer 1 to scan through the reference spectrum and to lock onto a reference line which is spin-coupled to a second resonance line of the sample. The computer 2 then varies the frequency of the double resonance transmitter 16 via digital-to-analog converter 38 until the frequency of the double resonance transmitter 16 is at a frequency which produces a maximum effect on the resonance of the reference group. The intensity of the double resonance radio frequency energy is corrected by measuring the peak height of the reference line being monitored. The intensity of the double resonance transmitter is corrected by a signal fed to the transmitter 16 via digital-analog converter 38.

Although computer 2 has been described throughout as a digital computer 2, this is not a requirement. More particularly, computer 2 may also be an analog computer in which case the analog-to-digital converter 3 and digital-to-analog converters 6 may be eliminated.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyromagnetic resonance apparatus, means forming a gyromagnetic resonance spectrometer having certain operating parameters for exciting and detecting gyromagnetic resonance of a sample of matter to be investigated in a polarizing magnetic field to obtain gyromagnetic resonance data, means forming a computer having a memory in which to store resonance data and for performing logic operations on the stored data, means for feeding the gyromagnetic resonance data to said computer means for storage in the memory, the improvement comprising, means for processing said stored resonance data to derive an output for correcting at least one of the operating parameters of said gyromagnetic resonance spectrometer, and means for feeding the corrective output to said gyromagnetic resonance spectrometer for correcting an operating parameter thereof to obtain corrected gyromagnetic resonance spectral data.

2. The apparatus of claim 1 wherein the operating parameters include, homogeneity of the polarizing magnetic field, field strength of the polarizing magnetic field, frequency of r.f. energy employed to excite resonance, stability of the phase of the radio frequency energy applied to excite the sample, strength of the radio frequency field applied for exciting resonance of the sample, rate at which the gyromagnetic ratio is swept for scanning resonance of the sample, time constant of a resonance receiving channel, frequency of double resonance radio frequency energy applied to the sample, intensity of double resonance radio frequency energy applied to the sample, and, sample spinning rate.

3. The apparatus of claim 1 wherein said computer means includes, means for causing at least one of the operating parameters of said spectrometer means to vary according to a predetermined program and wherein said means for processing the stored data to derive the corrective output includes means for processing the stored data resulting from varying the operating parameter of said spectrometer to determine an inflection value in the stored resonance data for deriving the corrective output.

4. The apparatus of claim 1 wherein said computer means includes means for causing at least two interrelated resonance data determinative operating parameters of said spectrometer to take a succession of different sets of values corresponding to coordinates of a succession of points in a grid of the interrelated parameters, and wherein said means for processing the stored resonance data to derive the corrective output includes, means for processing the stored data resulting from the sets of values for the operating parameters of said spectrometer to determine the corrective output.

5. The apparatus of claim 1 wherein said computer means includes, means for causing at least one of the operating parameters of said spectrometer means to be varied according to a predetermined program, and wherein said means for processing the stored data to derive the corrective output includes means for comparing the stored resonance data resulting from varying the operating parameter with stored resonance data resulting from prior variations of the operating parameter to derive the corrective output.

6. A method for automatically correcting at least one operating parameter of a gyromagnetic resonance spectrometer comprising the steps of, causing the spectrometer to excite and detect gyromagnetic resonance of the sample in a polarizing magnetic field to obtain resonance data, storing the resonance data in a memory, varying at least one of the resonance data determinative operating parameters of the spectrometer, processing the stored resonance data to derive a corrective output, and causing the corrective output to automatically change a value of at least one of the operating parameters of the spectrometer to automatically correct subsequent resonance data obtained from the spectrometer.

7. The method of claim 6 including the step of, varying at least a second interrelated resonance data determinative operating parameter of the spectrometer which is interrelated to the first mentioned varied operating parameter, causing the varied first and second operating parameters to take different sets of values corresponding to coordinates of a succession of points in a grid of the interrelated parameters, and wherein the step of processing the stored resonance data to derive the corrective output includes processing the resonance data resulting from the set of values of the varied first and second operating parameters of the spectrometer to determine the corrective output.

8. The apparatus of claim 1 wherein said computer means comprises a digital computer, and means for digitizing the resonance data for storage as digital data in the said memory of said computer.

9. In a spectrometer apparatus, means forming a spectrometer having certain operating parameters for obtaining spectral data, means forming a computer having a memory in which to store spectral data and for performing logic operations on the stored spectral data, means for feeding the spectral data derived from the spectrometer to said computer means for storage in the memory, THE IMPROVEMENT COMPRISING, means for processing the stored spectral data to derive an output for correcting at least one of the operating parameters of said spectrometer, and means for feeding the corrective output to said spectrometer for correcting an operating parameter thereof to obtain corrected spectral data.

* * * * *